US007200613B2

(12) United States Patent
Schlonski et al.

(10) Patent No.: US 7,200,613 B2
(45) Date of Patent: Apr. 3, 2007

(54) ASSET MANAGEMENT SYSTEM FOR NETWORK-BASED AND NON-NETWORK-BASED ASSETS AND INFORMATION

(75) Inventors: Steven T. Schlonski, Webster, NY (US); Thomas A. Silver, Rochester, NY (US); Kirk V. Pothos, Webster, NY (US); M. Kerrigan Hawes, Pittsford, NY (US); Matthew Scrafford, Scottsville, NY (US); Craig H. Mallery, Webster, NY (US)

(73) Assignee: Xerox Corporation, Stamford, CT (US)

( * ) Notice: Subject to any disclaimer, the term of this patent is extended or adjusted under 35 U.S.C. 154(b) by 555 days.

(21) Appl. No.: 10/287,896

(22) Filed: Nov. 4, 2002

(65) Prior Publication Data

US 2003/0093521 A1 May 15, 2003

Related U.S. Application Data

(60) Provisional application No. 60/345,080, filed on Nov. 9, 2001, provisional application No. 60/368,580, filed on Mar. 28, 2002.

(51) Int. Cl.
*G06F 17/30* (2006.01)
(52) U.S. Cl. .................. 707/104.1; 707/3; 709/218; 709/220
(58) Field of Classification Search .................. 707/10, 707/101, 104.1; 709/223, 224, 218, 220; 705/4, 7, 10; 715/500.1, 505, 513; 358/1.15
See application file for complete search history.

(56) References Cited

U.S. PATENT DOCUMENTS

| | | | | |
|---|---|---|---|---|
| 5,572,640 | A | 11/1996 | Schettler | 345/440 |
| 5,627,994 | A * | 5/1997 | Levy et al. | 711/150 |
| 5,680,325 | A * | 10/1997 | Rohner | 709/220 |
| 5,687,301 | A | 11/1997 | Stokes et al. | 358/1.13 |
| 5,687,320 | A | 11/1997 | Wiley et al. | 709/245 |
| 5,812,529 | A * | 9/1998 | Czarnik et al. | 370/245 |
| 5,821,937 | A * | 10/1998 | Tonelli et al. | 715/853 |
| 5,832,191 | A | 11/1998 | Thorne | 358/1.15 |
| 5,861,880 | A * | 1/1999 | Shimizu et al. | 715/500.1 |
| 5,930,779 | A * | 7/1999 | Knoblock et al. | 705/412 |
| 5,956,487 | A | 9/1999 | Venkatraman et al. | 709/218 |
| 5,970,464 | A * | 10/1999 | Apte et al. | 705/4 |
| 6,016,482 | A * | 1/2000 | Molinari et al. | 705/35 |
| 6,311,194 | B1 * | 10/2001 | Sheth et al. | 715/505 |
| 6,366,930 | B1 * | 4/2002 | Parker et al. | 707/203 |
| 6,381,644 | B2 * | 4/2002 | Munguia et al. | 709/225 |
| 6,460,055 | B1 * | 10/2002 | Midgley et al. | 707/204 |
| 6,629,149 | B1 * | 9/2003 | Fraser et al. | 709/245 |
| 6,799,198 | B1 * | 9/2004 | Huboi et al. | 709/203 |

* cited by examiner

*Primary Examiner*—Shahid Al Alam
(74) *Attorney, Agent, or Firm*—R. Hutter (57) ABSTRACT

A server on a network controls a database which functions as an "asset manager" for a large population of items or assets. For "network" assets which are capable of electronically communicating data about themselves, such as computers and digital printers, relevant data is gathered over the network and entered into the database. For "non-network" assets which are not capable of electronic communication, such as typewriters and furniture, information is gathered into the database by other means. Within the database, the distinction between network and non-network assets is largely hidden.

11 Claims, 13 Drawing Sheets

Contact

| | |
|---|---|
| Contact Name | Kerrigan.Hawes |
| Contact E-Mail | Kerrigan.Hawes@xerox.com |
| Contact Phone | (555)444-6677 |

Ownership

| | |
|---|---|
| Owned | Yes |
| Owner | Joe Smith |
| Department | Microsoft Team |
| Organization | GSG/OESBT/SDI |
| Cost Center | D980 |

Location

| | |
|---|---|
| Coordinates (X,Y) | 33,55 |
| Column | K8 |
| Room | 7322 |
| Floor | 1 |
| Building | 0111 |
| Building Czar | Carlos Rodriguez |
| City | Rochester |
| State | New York |
| Country | U.S.A. |

*FIG. 2B*

Service

| Service Level | Platinum |
|---|---|
| Service Contract Number | 12223-34234 |
| Warranty Date | 10-January-2001 |
| Deployed Date | 10-January-2001 |
| Projected End of Life Date | 10-January-2006 |
| Legacy Equipment | Yes |

Accessories

| Name | Part Number | Serial Number | Cost | Description |
|---|---|---|---|---|
| Stapler | 1234 | 11-AA-ZZ | $100 | For Finishing |
| Hard Disk | 2345 | 22-AA-ZZ | $200 | For Spooling |

CRUs (Customer Replaceable Units)

| Name | Part Number | Manufacturer | Lifetime Cost | Usage | Description |
|---|---|---|---|---|---|
| Black Toner | 9876 | Xerox | $100 | 10000 | Black Powder |
| Fuser Oil | 8888 | HP | $200 | 1000 | Oily Stuff |

FIG. 2C

Custom Fields

| Custom Property 1 | Value 1 |
| Custom Property 2 | Value 2 |
| Custom Property 3 | Value 3 |
| Custom Property 4 | Value 4 |
| Custom Property 5 | Value 5 |
| Custom Property 6 | Value 6 |
| Custom Property 7 | Value 7 |
| Custom Property 8 | Value 8 |
| Custom Property 9 | Value 9 |
| Custom Property 10 | Value 10 |

Dates

| Install Date | 10-January-2001 |
| Last Updated | 4-March-2002 |

Asset Group Membership

| Asset Groups | All |
| | A-Zone |

Web Interface
Printer Administration

Home  Help

Printers /Assets | Wizards | Reports | Administration

Site  Building 111

Status History for Printer: Alpha

Find
[      ] Go

Advanced
☒ Printers  ☐ Queues
☐ Assets

Printers
  Add New Printer
  Default Groups
    ● Error
    Unconfigured
    Unassigned
    Missing
    Newly Discovered
    All
  Create New Group
  Custom Groups
    A-Area
      B-Area
  Personal Groups
    C-Area

History Range

| | Start Date | 23 ▼ | Jul ▼ | 2001 ▼ |
|---|---|---|---|---|
| | End Date | 23 ▼ | Jul ▼ | 2001 ▼ |

[Refresh Data]  [Back]

Status History

| Severity | Training Level | Alert Description | Poll Date |
|---|---|---|---|
| ⊗ | Untrained | H02-02 75-02 Tray 2 empty. Reload the paper tray. | 7/23/01 20:55 |
| ⚠ | No Intervention Required | 07-525.05 52-52 Tray 5 (Bypass) does not detect any paper. User intervention is required to add paper to Tray 5. | 7/23/01 20:55 |

ASSET MANAGEMENT SYSTEM FOR NETWORK-BASED AND NON-NETWORK-BASED ASSETS AND INFORMATION

CLAIM OF PRIORITY TO PROVISIONAL APPLICATIONS

The present application claims priority from the following U.S. Provisional Applications No.60/345,080, filed Nov. 9, 2001; and 60/368,580, filed Mar. 28, 2002.

TECHNICAL FIELD

The present application relates to an "asset management system" in which information about a large population of assets of many different types, such as office equipment and furniture, can be gathered and managed.

BACKGROUND

With the rise of network communication among machines such as computers, printers, and copiers in an office context, it has become possible to discover, manage, and control a large fleet of such machines over a network. It is possible to monitor each of a large number of machines via a central computer and determine, for example, when any machine is in need of maintenance (such as installing a new toner cartridge) or repair. When a single machine on the network is in need of such attention, the machine can communicate to the central computer with an error or status message sent over the network in any of a number of known protocols.

The information which is exchanged over a network is typically of a highly "electronic" nature. That is, such information as would be usefully communicated between a machine and the central computer, such as network addresses, print counts, or error messages, is readily derived from the regular operations of controllers within the machine and is easily converted into a format suitable for communication to the central computer. Of course, as network communication is inherent to the operation of, for example, a digital printer or copier, the network communication of such a machine is simply taken for granted.

The present application relates to a system for retaining information about a large set of not only electronic machines, but also any "assets" which may or may not have inherent network-communication capabilities. Such assets may include machines such as analog copiers, typewriters, and telephones; and may further include items such as desks and chairs.

DESCRIPTION OF THE PRIOR ART

U.S. Pat. No. 5,572,640 discloses "discovery/layout" software which configures a general purpose computer system to act as a management station using the SNMP protocol. The software has a discovery mechanism and a layout mechanism which, in combination, permit the software to provide various submaps on demand to a display.

U.S. Pat. No. 5,687,301 is a system which allows for field changes of the function of a print driver based on the application requesting print driver services. Using a utility, an application is selected and a flag is set that indicates the problem function. The flag and information about the associated application are stored in a data structure, and the data structure is stored in a storage device. When the application requests services of a printer driver, all the data structures are scanned looking for an entry for the application. If an entry is found, then the function flag is used to direct a change in the function of the printer driver.

U.S. Pat. No. 5,687,320 discloses a system for allowing a selected type of network device or resource, such as printers, to be discovered on a subnetwork and on remote subnetworks on a network. A broadcast message is sent requesting a response from each host on the subnetwork with a file having a listing of the device. Upon receipt of responses, a "stifle" message is transmitted to the host, thereby allowing subsequent broadcast messages to generate responses from remaining hosts. The responding hosts are then queried in order to obtain address information of potential devices on the subnetwork.

U.S. Pat. No. 5,832,191 discloses a method for enabling a printer which is newly installed on a network to automatically communicate with client processors on the network. In the disclosed arrangement, each printer installed on the network constantly broadcasts printer identification data onto the network. Each printer on the network broadcasts information about a specific predefined format.

U.S. Pat. No. 5,956,487 discloses the concept of providing web access functionality in a device such as a printer, to enable widely accessible and enhanced user interface functions for the device. A network interface in each device enables access to the web page by a web browser such that a user of the web browser accesses the user interface functions for the device through the web page.

SUMMARY OF THE INVENTION

According to one aspect of the present invention, there is provided a method of retaining data about a plurality of assets, the assets including network assets and non-network assets, the data including network data and non-network data, the network data being obtainable over a network. For each asset, a file is associated with the asset, the file including spaces for holding data, each space being associated with a type of data. For a network asset, a space associated with a first type of data in the associated file is populated with the network data. For a non-network asset, the space associated with the first type of data in the associated file is populated with non-network data.

According to another aspect of the present invention, there is provided a method of managing a set of assets interconnected over a network. For a first subset of assets, each asset is polled for a first type of data at a first predetermined frequency. For a second subset of assets, each asset is polled for the first type of data at a second predetermined frequency.

According to another aspect of the present invention, there is provided a method of managing a plurality of assets, each asset being associated with a file, each file including a plurality of spaces for retaining data of predetermined types, a first type of data being an identifier of the asset. For a first subset of the plurality of assets, assigning a first appendage to each identifier. An identifier for an asset in the first subset can be identical to an identifier for an asset not in the first subset, except for the appendage.

BRIEF DESCRIPTION OF THE DRAWINGS

FIGS. 2(A–D) through 10 are a series of example screens or windows as would be generated by a user interface of a computer operating an embodiment of an asset manager.

DETAILED DESCRIPTION

Figure 1:
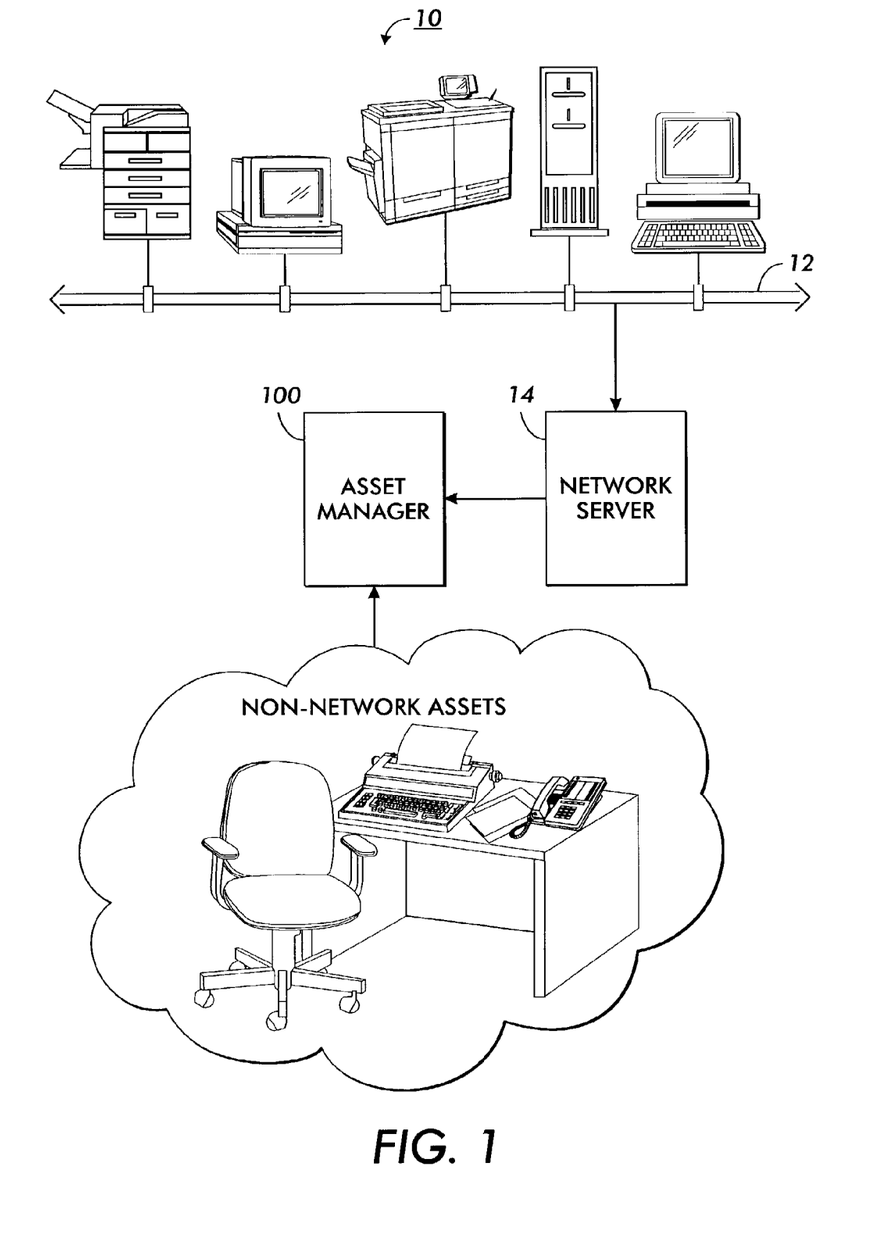
FIG. 1 is a simple diagram showing the flows of information into a server operating according to an embodiment of an asset manager.

FIG. 1 is a simple diagram showing the flows of information into a server operating according to an embodiment. An asset manager 100 is a program, typically running on a network-addressable server, which retains information about each of a population of assets. Some assets, such as the printers, computers, and servers generally indicated as 10, each have the electronic capability of retaining and making available a quantity of what is here called "network data." Network data can be defined as any data about an asset that can be found out by electronically querying the asset, or also can be deduced by data obtained by electronically querying the asset. The network data which is retained in each asset 10 typically includes an IP (network) address of the asset, other information, such as manufacturer and model of the asset, which can be deduced from the IP address, network settings, and MAC (media access control, which is the physical address of the network interface card address for the asset). The network data is obtained through generally known querying techniques over a network 12 which connects each asset 10 to the asset manager 100.

The assets to be managed can include both "network-based assets," that is, equipment such as printers and computers, from which important information can be derived electronically, such as through known "network discovery" techniques; and also what are here called "non-network assets," which are things which do not have the capability for network discovery, such as stand-alone light-lens copiers, desktop printers dedicated to single computers, typewriters, calculators, and postage meters, as well as things which are not even electrical, such as desks and cabinets. Further, the system can take into account and manage non-electronic or "non-network" information about network-based assets, such as an inventory number or rental contract number or service or ownership of a computer or network printer. Non-network information can be defined as data about a particular asset which is largely incapable of being obtained through electronic means from the asset. As will be described in detail below, such non-network data can include a rental contract number, the name of a person using the asset, the location of the asset, the kind of warranty associated with the asset, etc. The database within the asset manager 100 which holds the network data about an asset such as a computer or printer can further include spaces for retaining the non-network information associated with the asset. This non-network information about an asset is entered manually or imported via CSV (a format for transmitting spreadsheet-like data), when a particular asset is installed on the network 12 or otherwise enters the system. Alternately, certain types of non-network information can be deduced from network information through predetermined rules retained in the asset manager 100: for example, it may be set forth that all discovered printers of a particular vendor (network information) and model shall be assigned a certain rental contract number (non-network information), or that all assets discovered on a particular subnetwork (network information) are known to be in a certain building and are therefore assigned a certain location code and a certain systems administrator name (non-network information).

Another class of assets of interest in the present invention are non-network assets, that is, assets with no network capabilities at all. Anything can be considered a non-network asset, such as desks, chairs, and cabinets. Of particular interest here are assets which, although not addressable via a network, have attributes which are similar to that of network devices, which may need to be recorded is the asset manager over time: for example, a light-lens, stand-alone copier may not be network accessible, but still has associated with it a "print count" and daily "print volume" exactly in the manner of a network printer, as well as error codes which may be consistent with codes used by network devices and transmitted over the network 12. It is desirable, for types of data which is common in type between network and non-network assets, to have the asset manager be indifferent as to whether the data was entered over a network or manually.

Another type of information which may be retained by the asset manager 100 is a history of each particular asset: for instance, there may be retained a list of every recorded location an asset has been located, along with move dates; in such a case, certain attributes of an asset may change at certain time and remain constant in other conditions. For example, a telephone or fax machine may be moved from one physical location to another, but its phone number may or may not change with the move; a feature of the asset manager 100 is an ability to retain a history of multiple attributes of an asset.

FIGS. 2A–D through 9 are example windows as would appear on a computer monitor associated with the network server 14 controlling asset manager 100. In the present embodiment, the asset manager can be implemented largely as an "active directory," and the various screens shown in the Figures are examples of the types of data which can be retained, retrieved, and processed using an active directory system. Active Directory is a directory service that is provided by the Microsoft® Windows® 2000 Server product. This directory service is simply a collection of objects that represent physical and logical enterprise resources such as computers, printers, servers, shared folders, user accounts, groups, etc. A collection of these resource objects can be organized a hierarchical, upside-down tree-like fashion and stored in a database. According to the MSDN Library (January 2001): " . . . Active Directory gives network users access to permitted resources anywhere on the network using a single logon process. It provides network administrators with an intuitive hierarchical view of the network and a single point of administration for all network objects." In this context, a "forest" is defined as a " . . . collection of one or more Windows 2000 Active Directory trees, organized as peers and connected by two-way transitive trust relationships between the root domains of each tree . . . ." Each forest contains one enterprise-wide schema partition "(class and attribute definitions for the directory)", one enterprise-wide configuration partition (replication topology and related metadata), and one or more domain partitions, depending upon the number of domains contained within each Active Directory tree.

The network server 14 according to this implementation enables a user to query a Windows® 2000 Global Catalog server and an Active Directory Partition for those network printers that have an associated Windows-based print server. Network server 14 automatically queries the Global Catalog server of the local forest (i.e. the forest in which the server 14 resides) and will provide the user with a list of available Active Directory Partitions. The user can then select the appropriate Active Directory Partitions she wants the server 14 to check for network printer/queues; for non-network assets and information, the necessary data is entered by other means.

When a network printer is detected from the Active Directory Partition, the server 14 checks its database to determine if the printer needs to be added. If the printer does NOT already exist within the Server's device database, it is added. If the printer already exists within the database, the Active Directory Partition attribute is then updated for that printer's record in the database.

One embodiment also allows one to query Global Catalog servers from other forests that a large company may have implemented. In any event, the Active Directory feature will cause more printers to appear within the default "All" printer group. This could be considered as another form of printer discovery.

FIGS. 2A–D is a window (shown in four parts), available through data retained in asset manager 100 and based at least in part from network data collected from any asset 10, including a non-network asset, as described above. At the left of the window can be seen a file organization in which a certain asset, in this case a printer, can be located. At the top of the left side of the window, underneath the "find" space, can be seen an option provided to the user to organize and view the assets managed by asset manager 100 as printers (MFDS and Network Printers), queues (which displays a population of printers and associated print servers by queues into which prints jobs are entered) or as assets (which includes non-network assets). The user can select which aspect of the selected asset is wished to be viewed.

Figure 2A:
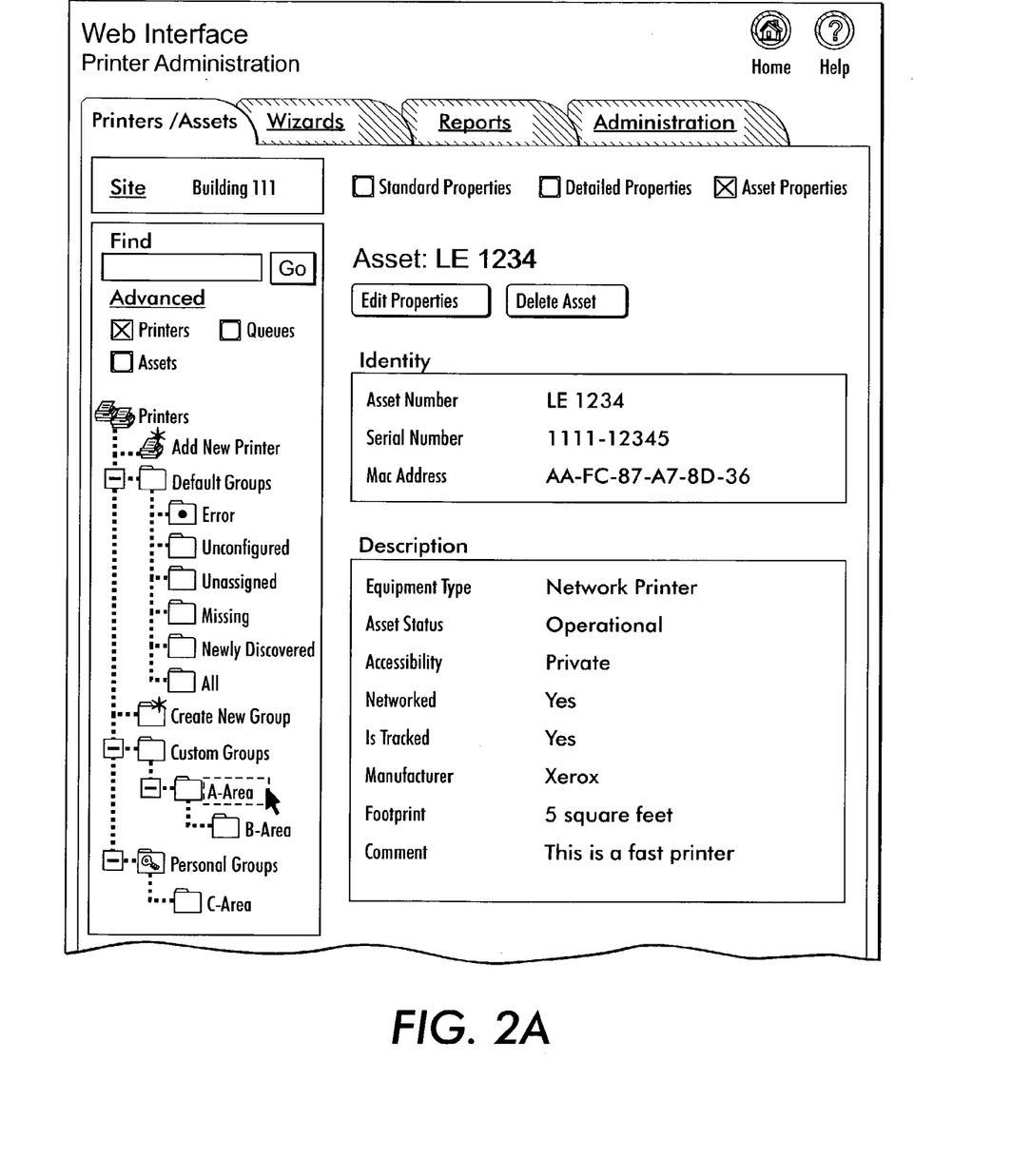

Along the top of the screen can be seen options to show "standard properties," "detailed properties," and "asset properties." Of these the first two mainly relate to network information, while the third may emphasize non-network information about a selected asset. As "asset properties" is selected in the Figure, the asset properties are shown under the "identity" and "description" headings. It will be noticed that a number of "description" variables associated with the selected printer are of a nature which would not be directly available, for instance, in a network discovery process: rather, these values would be either entered manually or inferred for network information about the printer.

Figure 2B:
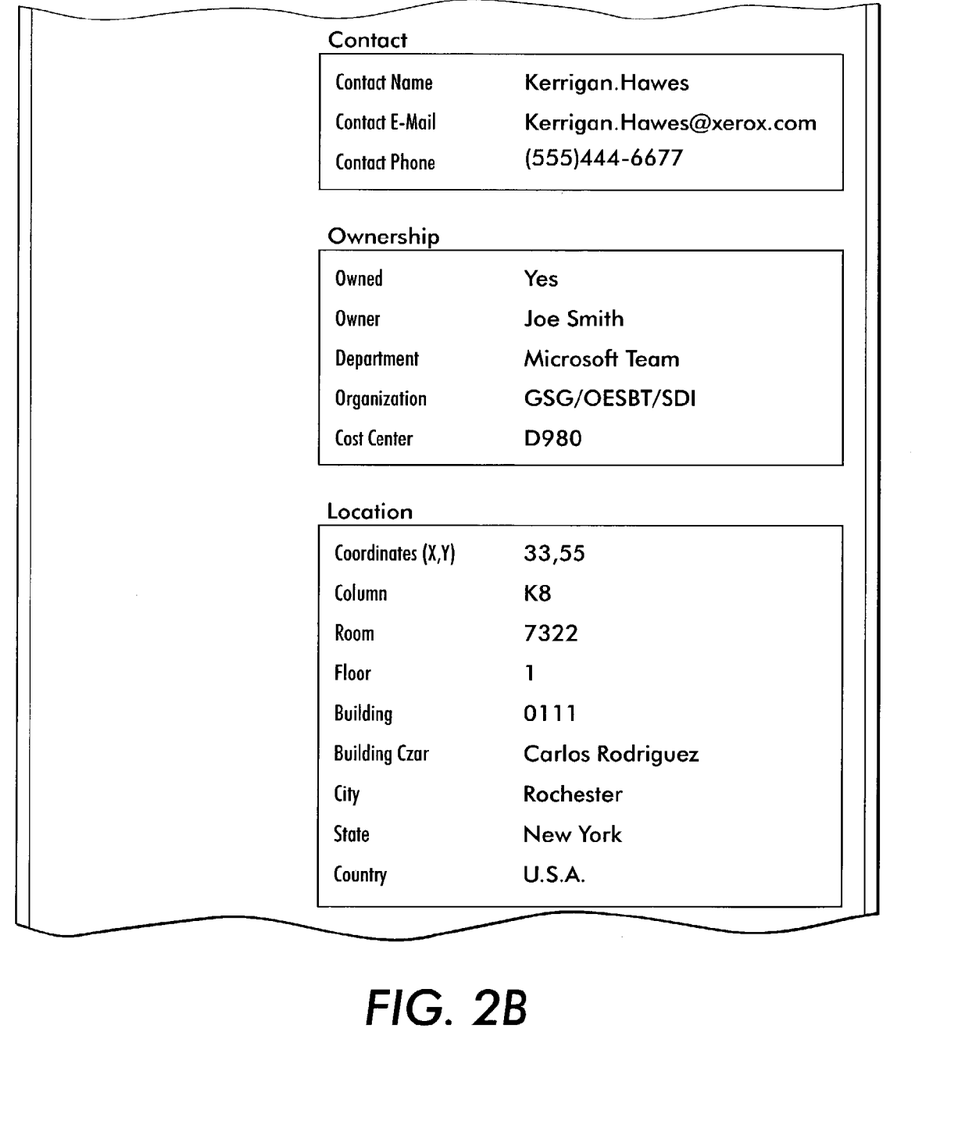
Figure 2C:
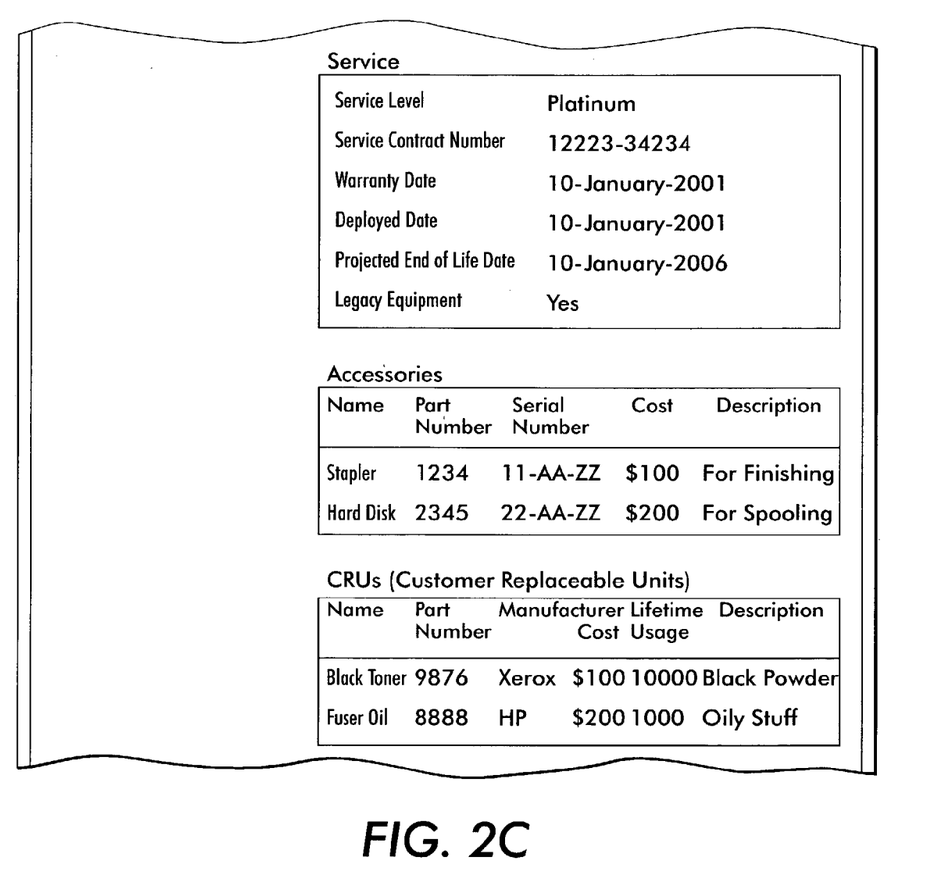
Figure 2D:
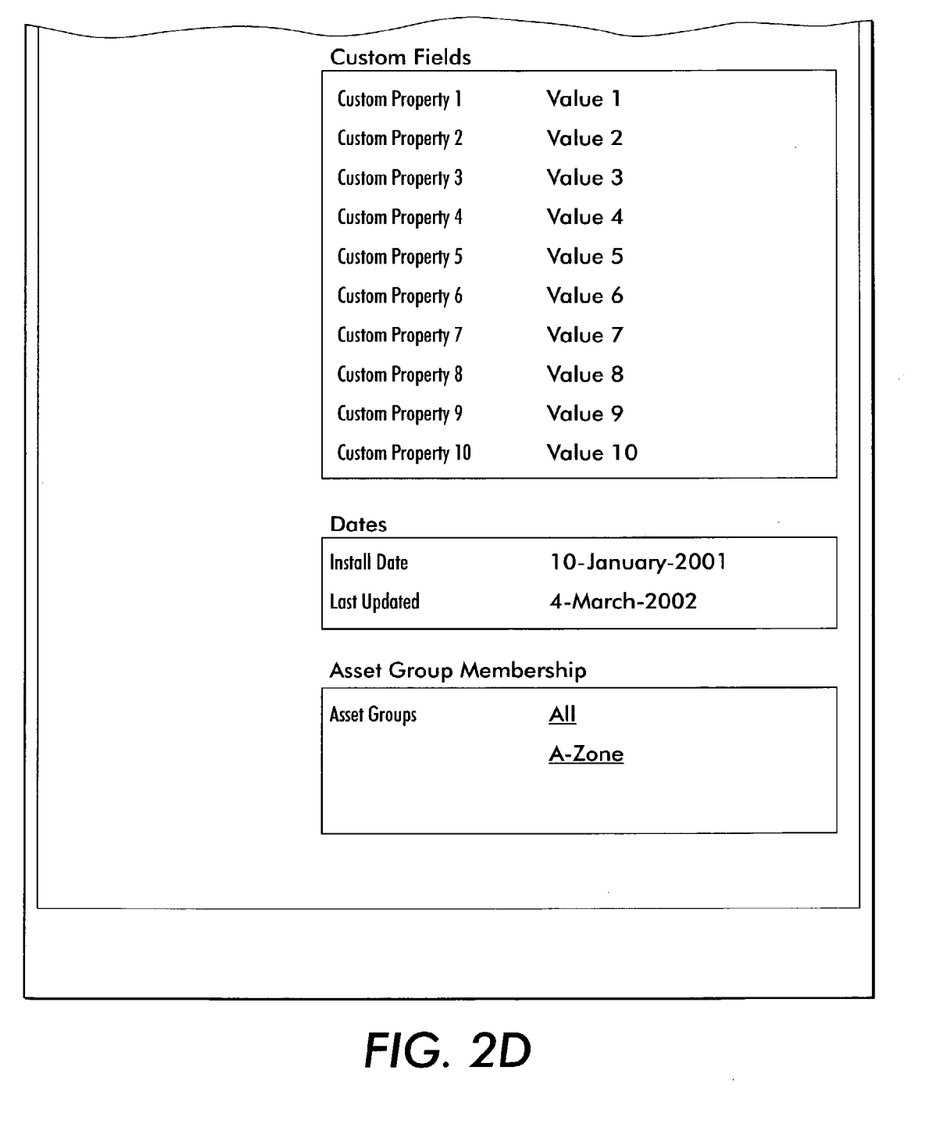

FIGS. 2B–D, the balance of the window shown in FIG. 2A, show other possible types of data associated with a particular asset that can be entered into the database of asset manager 100. Of course, with such a database, cross-referencing of various assets by any attribute thereof is readily accomplished: for example, using the database in asset manager 100, a user could quickly identify all assets which are sourced from a certain manufacturer; all assets having warranties expiring within the next year; all assets managed by a certain person, etc.

In broader terms, the various fields or spaces for data associated with an asset and shown in FIGS. 2A–D correspond to spaces in a file within asset manager 100, the file being associated with a certain network or non-network asset. Each space, as seen in FIGS. 2A–D, corresponds to a predetermined type of data. For network information from a network asset, the relevant spaces can be populated by known means of electronic network discovery, such as with SNMP. For non-network data from any kind of asset, the relevant spaces are populated by other means, typically but not necessarily by manual entry.

It is evident that certain types of data can be entered into appropriate spaces in a file associated with an asset in a semi-automatic manner, by simple inference rules which can be entered into the system. By way of example and not limitation, it may be known that all assets in building X are administered by person Y, and vice-versa; all assets entered by whatever means into the system within a certain month and which are located in building X have a warranty which expires on a certain date; all assets obtained from vendor Z have a lease which expires three months after entry into the system; all computers of a certain type have a one-year warranty; etc. Such automatic inferences can be exploited to reduce the amount of keying necessary to enter non-network data. Also, discrete spaces associated with each of a large number of assets, whether or not network devices, can be caused to be changed simultaneously. Such a capability is useful where, for example, a set of assets are changing ownership, warranty, lease, location, etc.

Figure 3:
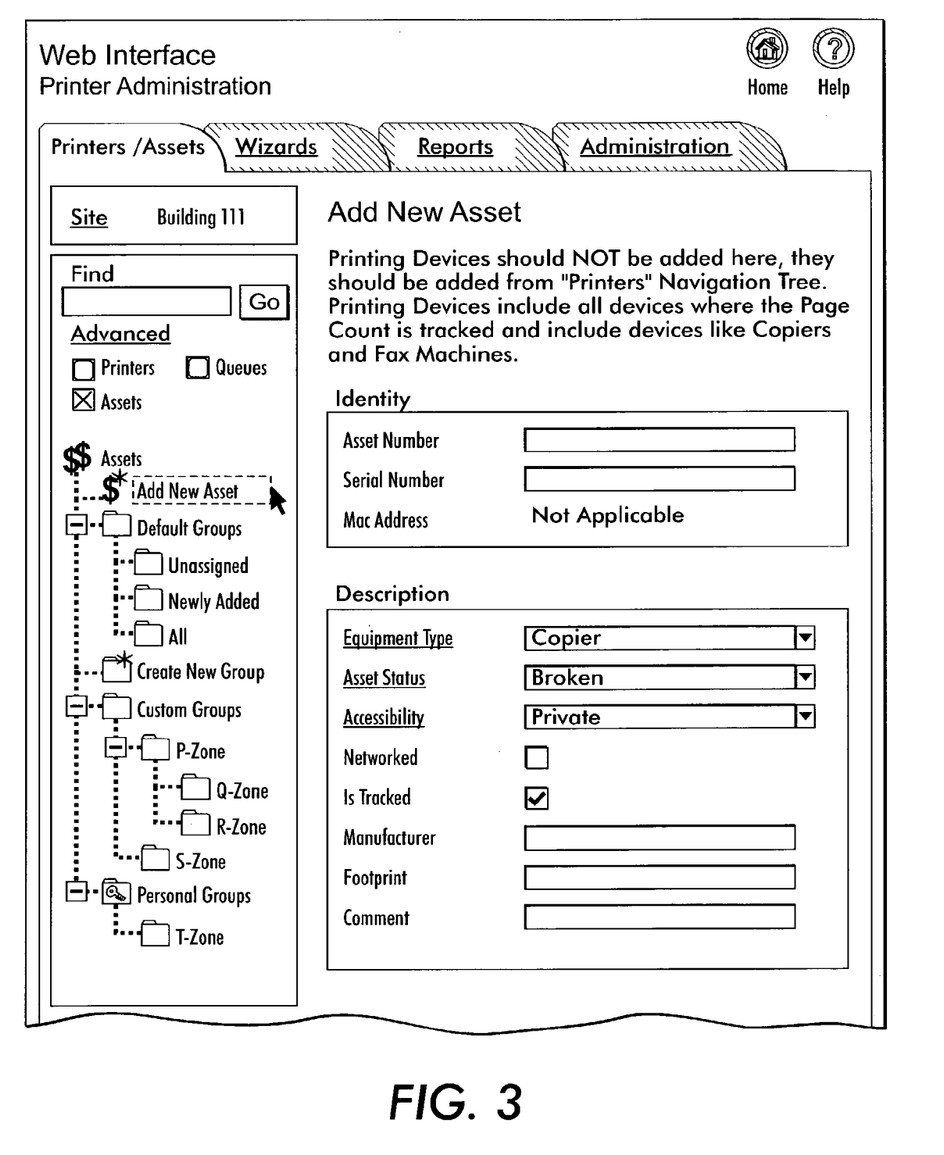

FIG. 3 shows a window displayed by asset manager 100 when it is desired to add an asset to a population. As can be seen from the description to the user on the window, this window would be displayed only in the case of adding a non-network asset: in the case of a new network asset, such as a network printer, most of the shown fields would be filled in automatically as part of the discovery process. The blank fields which are displayed in the Figure act as prompts to a user to fill in or select from a predefined list the required or desired data for the asset database.

Figure 4:
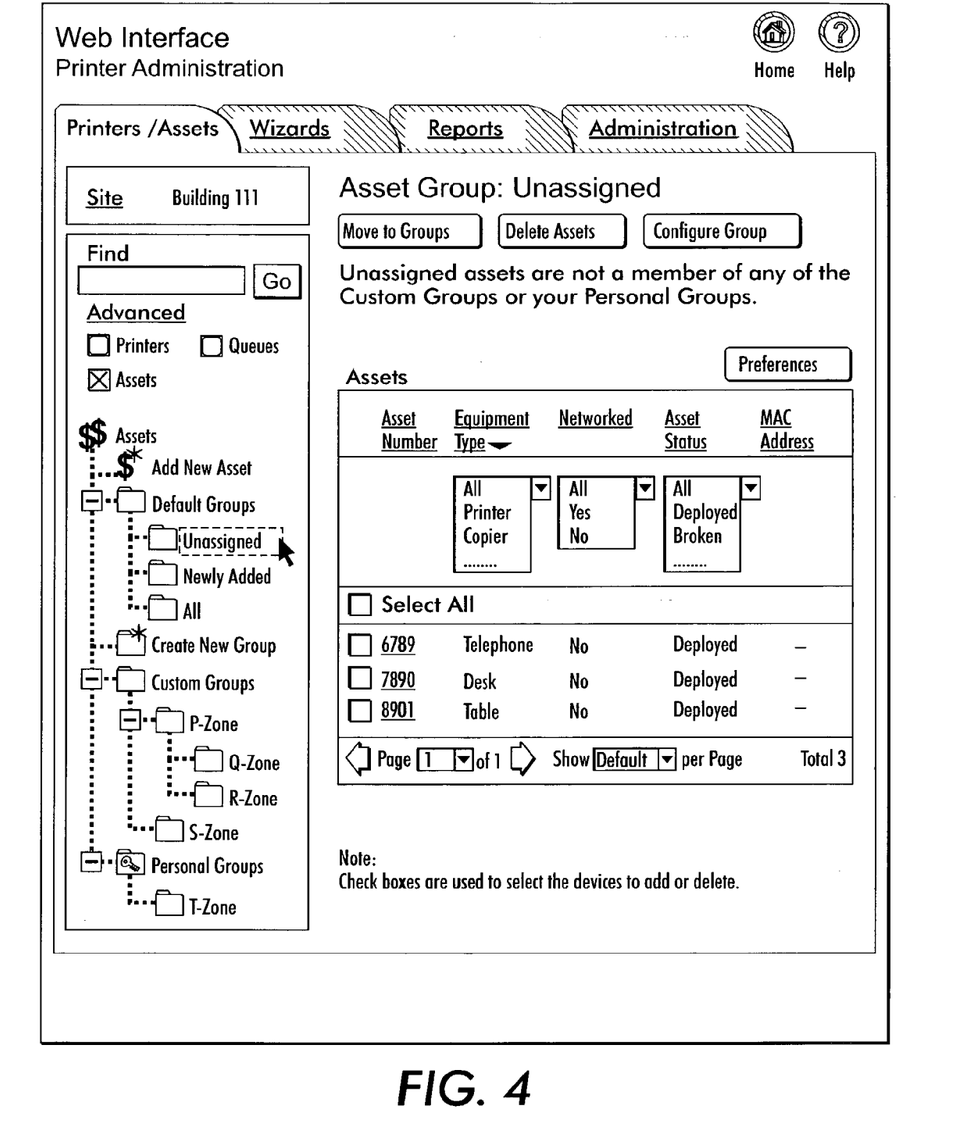

FIG. 4 shows an example window showing properties, again based on data retained within asset manager 100, for a group of non-network assets, in this case a suite of furniture (telephone, desk, table, etc.) for a single office. As shown just above the list of items in the window, there are provided pull-down menus for a user to sort the view of displayed assets based on available values. Once the relevant data is entered, the group of assets may be assigned to another group in a hierarchy.

Figure 5:
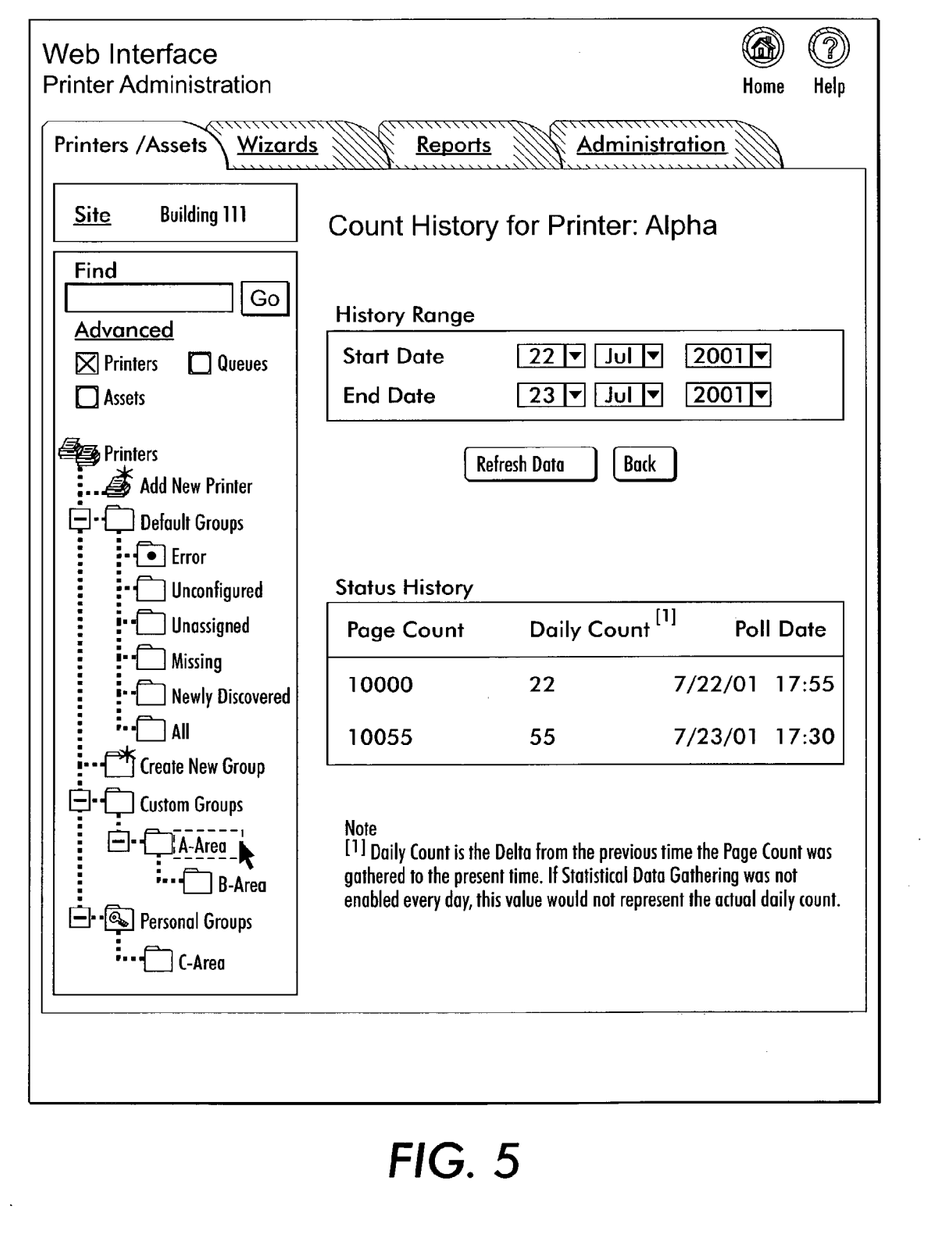
Figure 6:
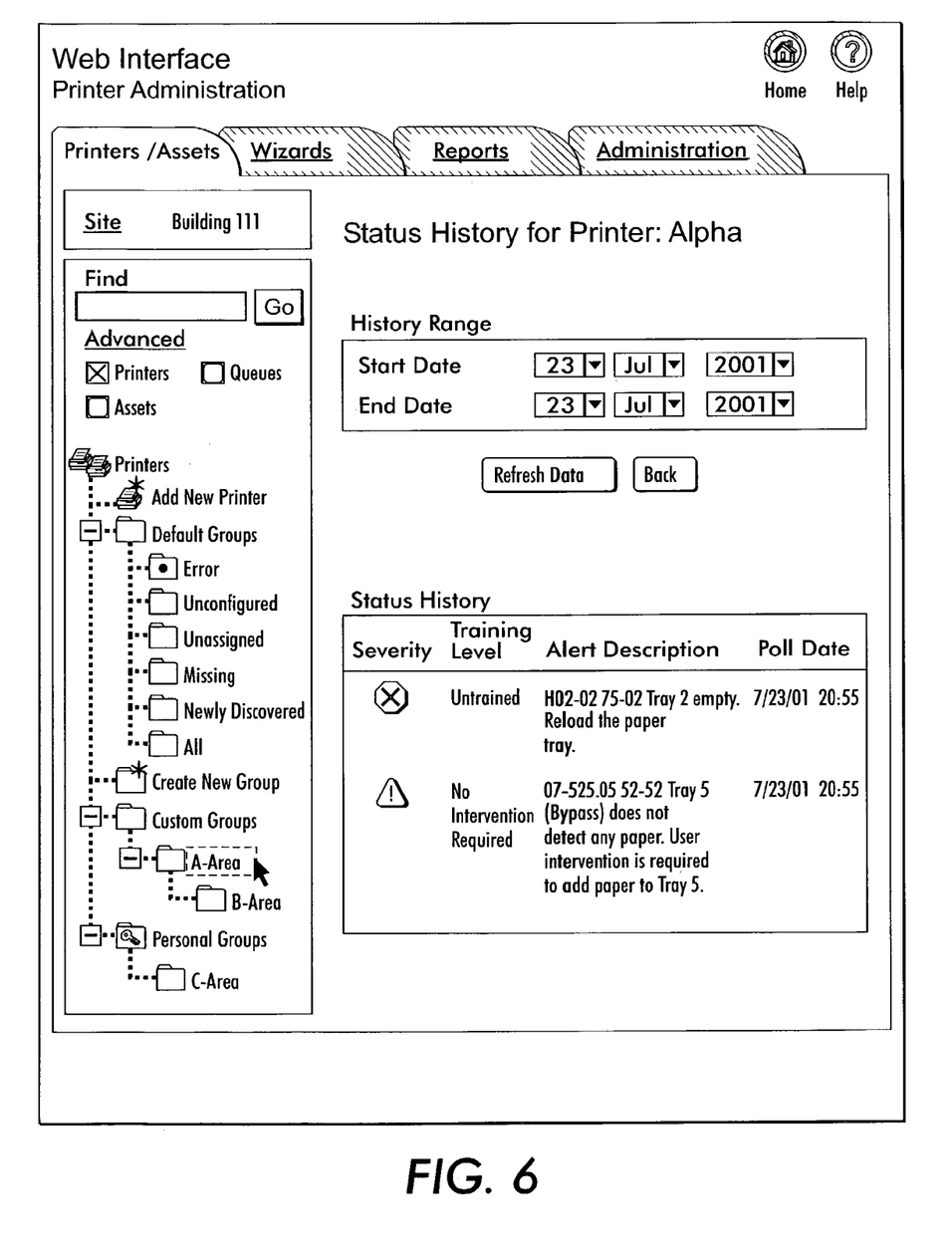

FIGS. 5 and 6 are windows relating to print counts and status of a particular selected printer on the network. Such data is of course useful in both maintenance and per-print billing of printer use. As mentioned above, certain non-network assets, such as light-lens copiers, may not be accessible for data collection over a network, but nonetheless have similar types of data associated therewith over time, such as print/copy counts and error codes. It is often desirable that the copy counts from a stand-alone copier be treated the same as print counts from a printer, within a single database. However, because stand-alone copiers require manual reading and entry of copy counts (such as via a CSV import/export wizard), the copy counts may not enter the asset manager 100 on a perfectly regular basis.

Another aspect of the asset manager 100 is an ability to retain a fault history of a particular asset, retaining what type of fault occurred at what time, as shown in the example window of FIG. 6. By extension, by comparing the fault occurrences over time to other attributes and conditions which occasionally change and which also are recorded in a history (e.g., location of the asset, service contract), clues can be inferred which may be useful in optimizing up-time and other use of the asset. Asset history data can also relate to non-network information, for example, the users, lessors, warranties, locations, etc. of the asset through the lifetime of the asset: such historical information can be useful when, for example, returning leased furniture to its vendor, or redistributing furniture after its occupant has left the company.

Also associated with the "asset history" functions as shown in FIGS. 5 and 6 is a query capability to isolate certain assets of interest by providing date ranges for certain data associated with the assets. Such a capability is useful for addressing administrative questions such as: "Which computers (or, what furniture) will go off-lease in the next 60 days?"

Figure 7:
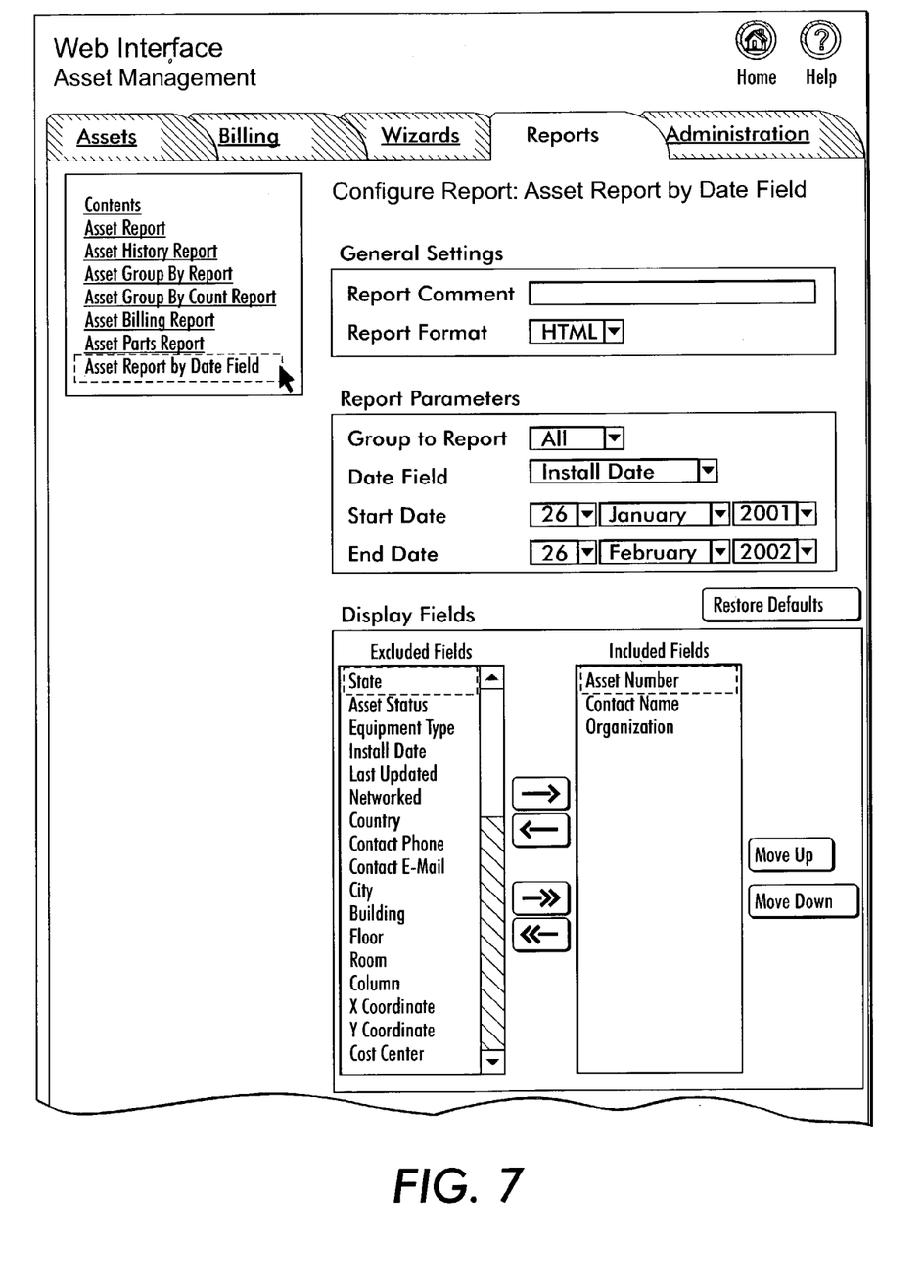

FIG. 7 shows an example screen by which a subset of assets can be isolated by, in this case, a date range of install dates. Other ranges for other types of data can be imagined for various administrative purposes.

Figure 8:
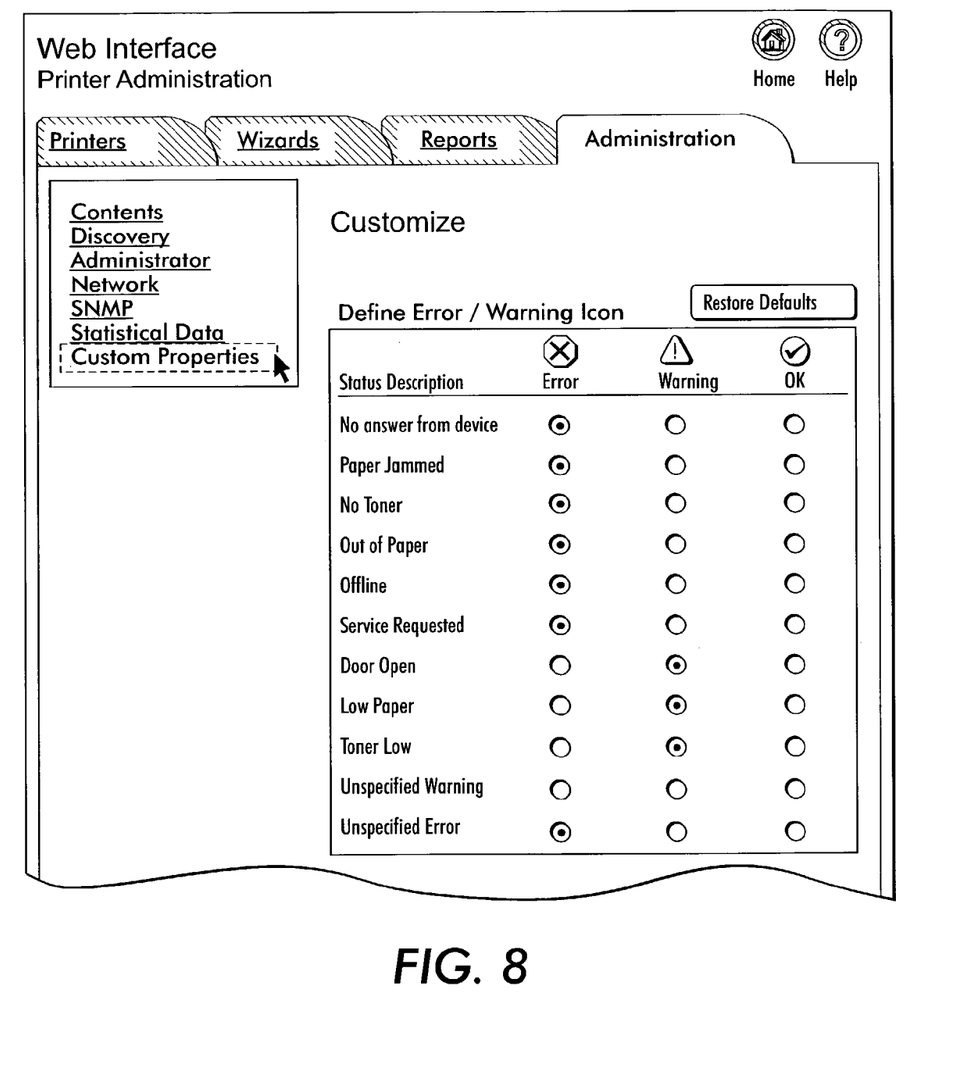

The basic capabilities afforded by the present embodiment can also be exploited to monitor faults in network or non-network devices. With a large population of devices, a system administrator or other user may wish to prioritize which types of error messages are to be considered more important than others. FIG. 8 shows an example screen by which a system administrator can map, by type of incoming message from a device 10, which messages are considered higher-priority than others. For instance, an incoming message of "paper jammed" by be assigned a "red" importance, while "toner low" may be assigned a "yellow" importance. In this example, "red" incoming messages may be caused to create an instant pop-up message on the user's screen, while "yellow" messages may be collected and, for example, displayed only on daily or hourly e-mail reports.

Another capability that is possible in the present embodiment is allowing a user to customize the conditions associated with a server or its associated print queue under which an electronic mail message would be sent to a particular user for reason of a fault at a particular printer or other asset. The asset manager 100 can provide to a user (such as a system administrator) options to select which particular faults merit e-mail alerts, and direct to whom such e-mail alerts should be sent, i.e., fault messages which are best addressed to a local administrator versus fault messages which should be addressed to a vendor or manufacturer.

Because different printers from different vendors may use different arbitrary fault codes to represent essentially similar faults, the asset manager 100 may also be provided with an error code "dictionary" by which error codes from different printers from different vendors are displayed in a consistent manner in a single view. Also, because the asset manager 100 can obtain data about print servers as well as printers, the e-mail alerts can be related to faults within individual printers, or related to faults involving queues which reside on servers.

The network server 14 can be controlled to perform polling operations, such as to check the operating status, of individual devices 10 with a predetermined regularity. Even on a single network 12, certain devices, such as devices which receive high use or which "belong" to important people, can be caused to be polled with a higher frequency than other devices. For example, selected "high-priority" devices 10 can be polled for status every three minutes, while other devices 10 on the same network 12 can be polled every thirty minutes. The status data that can be sampled at the desired frequency can include malfunction or maintenance requirement of an asset, such as a malfunction, lack of marking material or paper, or any error as illustrated in FIG. 8. With the present embodiment, a selected group of devices of special interest can be isolated for high-frequency polling or status checking. The selected devices can be chosen independently of any network they are associated with.

Figure 9:
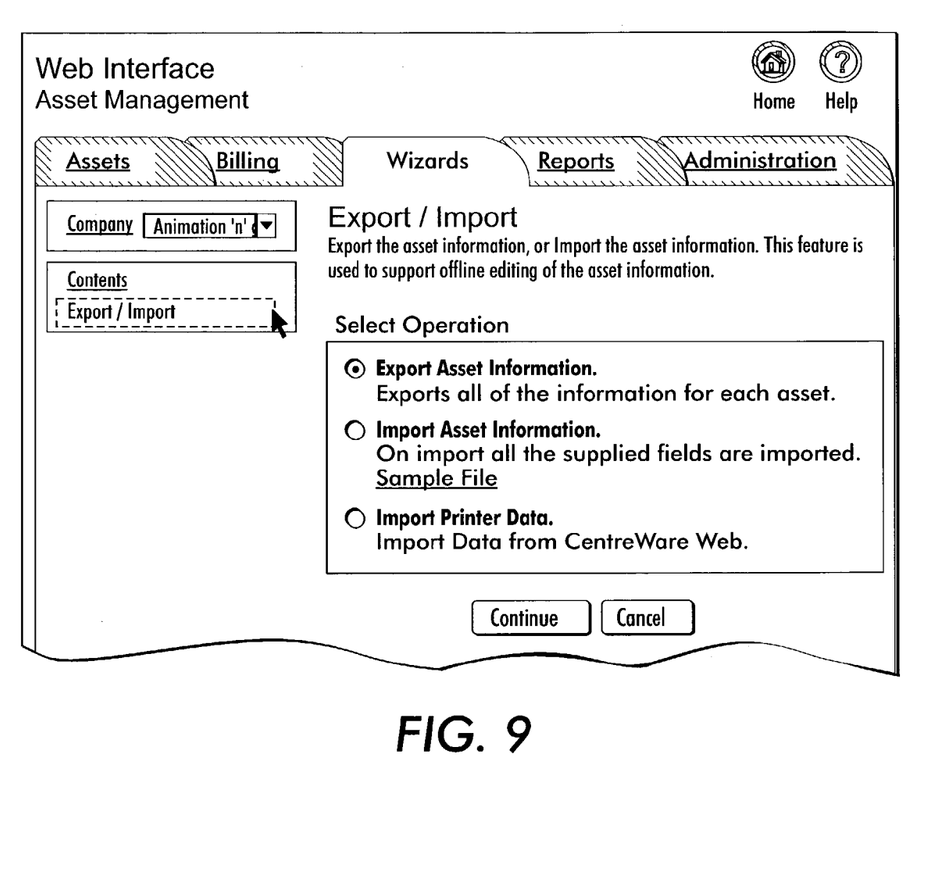

Returning to FIG. 1, if a network server 14 is used to obtain network-based data such as SNMP status message from networked devices 10, it may be desirable to seamlessly export the network-based data to the general asset manager database. When a new device 10 is installed and then discovered by network server 14, it is also desirable to add the new asset to the asset manager database as well. This process of adding new network assets, filling the related fields therefor, and exporting the information to the asset manager database, can be automated and made largely invisible to a user. FIG. 9 is a window associated with the asset manager 100 which illustrates a capability for importing and exporting, between the asset manager 100 and any other database, what are known as "billing meters" associated with a each of a population of printers and servers.

A useful capability of one embodiment is that one asset manager, running on one server, can be used to manage the assets of multiple, mutually-independent companies or other entities. In practice, this capability requires that the different companies' asset data are kept completely independent of each other; that special templates or information fields desired by one company are not seen or invoked when managing the assets of another company; and that security settings used by one company are not used by another company. Another aspect of maintaining the necessary separation of asset data is permitting accidental replication of asset serial numbers, provided all of the asset serial numbers are unique within a single company.

Figure 10:
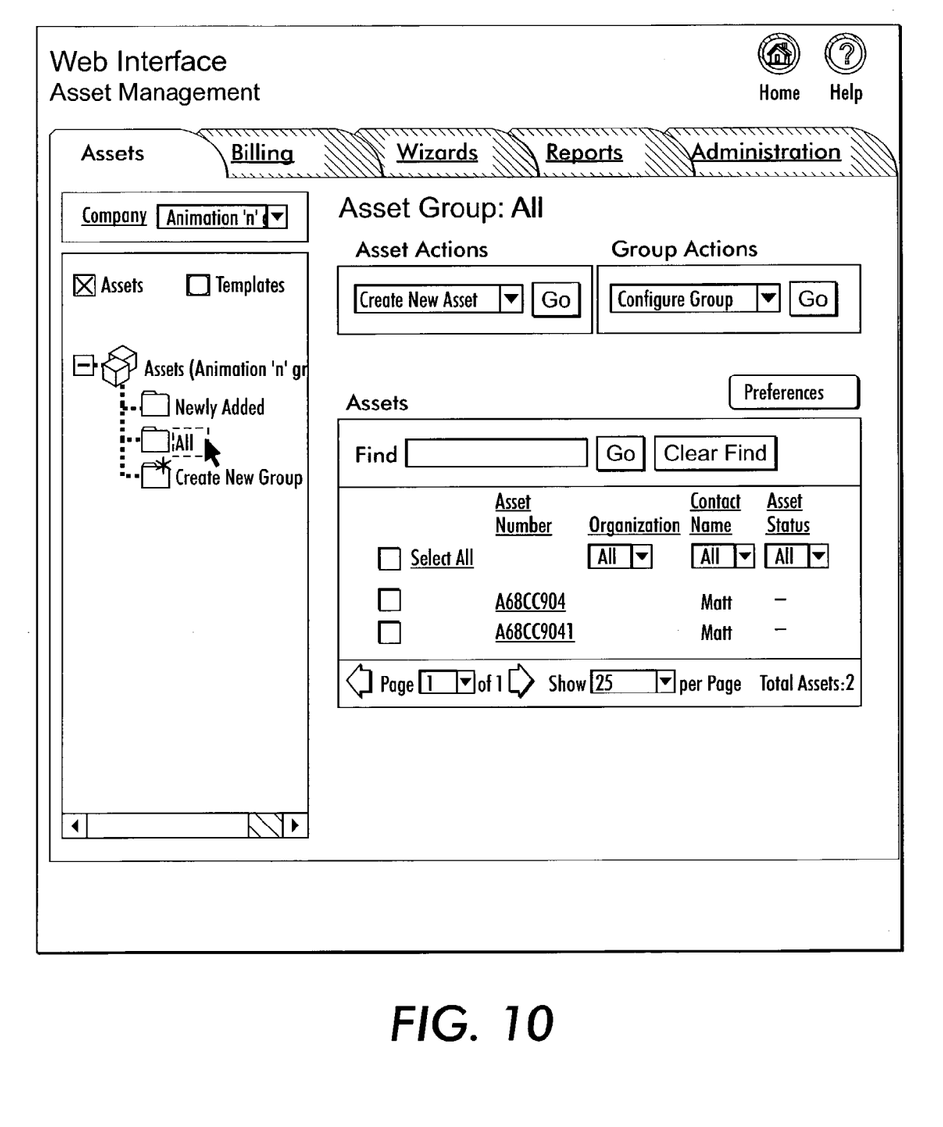

FIG. 10 is an example screen showing how a company managed by a single asset manager 100 can be selected via a pull-down menu. Broadly, the architecture of the asset manager databases is such that the top level of the total asset manager database is divided by company. Each company is assigned its own independent set of fields and templates, as required by each company, along with independently controllable security aspects governing the information within each company.

To address the duplicate asset number problem, one solution is to automatically append to each new asset number, as assets are created and added, a unique company code prefix or suffix (herein, called an appendage, regardless of its actual implementation). This company code can be made invisible or unapparent to users, but is retained in the database to distinguish assets of different companies. The appendages to the asset numbers or other codes are read by the server 14 operating asset manager 100 and used to invoke templates, screens, and other forms associated with the company; conversely, use of templates associated with one company, such as to create an asset, automatically cause the appendage to be appended to a new asset number.

The invention claimed is:

1. A method of retaining data about a plurality of assets in an effectively single database controlled by a computer, the assets including network assets and non-network assets, the data including network data and non-network data, the network data being obtainable over a network, comprising:

for each asset, associating the asset with a file in the database, the file including spaces for holding data, each space being associated with a type of data;

discovering a network asset, the network asset having a network address associated therewith;

as a result of discovering the network asset, creating a file and populating at least one predetermined space in the file with network data relating to the network asset;

inferring non-network data related to the network asset and populating at least one predetermined space in the file with the inferred non-network data relating to the network asset, the non-network data including data relating to at least one of a physical location of the asset, a person associated with the asset, a warranty associated with the asset, and a lease associated with the asset; and for a non-network asset, associating the non-network asset with a file and populating a space in the associated file with non-network data.

2. The method of claim 1, wherein at least one network asset is at least one of a group comprising a digital printer, copier, and facsimile machine.

3. The method of claim 1, wherein at least one asset outputs prints and does not have a network address associated therewith.

4. The method of claim 1, further comprising
for at least one type of data retained in a file, retaining a history of values of the data in the file.

5. The method of claim 1, wherein a type of data relates to a history of physical locations of the asset.

6. The method of claim 1, wherein a type of data relates to an identity of a vendor of the asset.

7. The method of claim 1, wherein a type of data relates to a fault experienced by the asset.

8. The method of claim 1, wherein a type of data relates to a history of faults experienced by the asset.

9. The method of ciaim 1, further comprising translating a fault code generated by a network asset.

10. The method of claim 1, further comprising
for each file associated with a subset of assets including at least one network asset and at least one non-network asset, updating data in one predetermined space for each file.

11. The method of claim 1, further comprising
displaying a template whereby the data for the predetermined space in each file is updated in substantially one operation.

* * * * *